United States Patent Office 3,280,096
Patented Oct. 18, 1966

3,280,096
POLYMERIZATION CATALYSTS
James C. MacKenzie, Wellesley Hills, Mass., assignor to Cabot Corporation, Boston, Mass., a corporation of Delaware
No Drawing. Filed Aug. 5, 1963, Ser. No. 300,098
28 Claims. (Cl. 260—94.9)

This invention relates to the polymerization and copolymerization of mono- and di-olefins such as ethylene, propylene, butene-1, styrene, isoprene and butadiene and includes within its scope novel catalysts for such polymerization reactions.

Accordingly, it is a principal object of the present invention to provide new and useful catalysts.

Other objects of the present invention will in part be obvious and will in part appear hereinafter.

In accordance with the present invention, mono- and di-olefins are polymerized or copolymerized by activated catalysts comprising the product of reaction of (a) a reaction product of hydroxyl groups on the surface of a finely-divided inorganic solid and certain organometallic compounds of quadrivalent Group IVb metals and (b) a Group IVa, Va or VIa transition metal halide or oxyhalide. The polymerization or copolymerization reaction can be effected at suitable temperatures within the range of from about −25° C. to about 250° C., and pressures ranging from below atmospheric upwardly to any desired maximum pressure, for example, 30,000 p.s.i.g. or even higher pressures.

Inorganic solids suitable for the purposes of the present invention generally include any inorganic solid which is available in finely-divided particulate form with hydroxyl groups on the surface thereof. For example, metal oxides such as alumina, zirconia, silica, thoria and magnesia, silicates such as chrysotile, actinolite, and crocidolite, and aluminates such as corundum and bauxite are all generally suitable for the purposes of the present inventon. It should be noted, however, that the ultimate efficiency of the catalyst components produced in accordance with the present invention is generally highly dependent upon the number of surface hydroxyl groups present per gram of finely-divided inorganic solid. Accordingly, in preparing the catalyst of the present invention, it should be kept in mind that the smaller the average particle size of the solid and the larger the quantity of hydroxyl groups on the surface thereof, the greater will be the potential activity and efficiency of the catalyst components and catalysts producible therefrom. Therefore, it is important to use as the starting material particulate, finely-divided solids having (a) and average particle diameter of less than about 1 micron, and preferably less than about 0.1 micron and (b) a hydroxyl group concentration on the surface thereof of at least about 0.1 milliequivalent per gram.

Organometallic compounds of Group IVb metals suitable for the purposes of the present invention are the compounds conforming to the empirical formula $$H_c R_d X M$$

wherein each H is hydrogen; $c$ is a number from 2 to 3; each R is chosen from the group consisting of any hydrocarbon radical, alkoxy radical and aryloxy radical; $d$ is a number from 0 to 1; X is any halogen; M is a metal chosen from the group consisting of the quadrivalent metals of Group IVb of the Mendeleev Periodic System; and the sum of $c+d$ equals 3.

Although it is appreciated that when in the above empirical formula $d$ is $o$, the resulting compounds cannot normally be termed organometallic compounds, it is intended that for the purposes of the present invention, all those compounds included with the scope of said empirical formula, be included within the scope of the generic term, "organometallic compound." Accordingly, in the present specification and claims, it is intended, and therefore, it should be understood, that the term "organometallic compound" refers to all compounds included within the scope of the above-defined empirical formula. In addition, it is pointed out that while, strictly speaking, silicon and germanium are not metals, it is intended, and therefore it should be understood, that for the purposes of the present specification and claims, silicon and germanium are metals.

Specific examples of R groups for substitution in the above formula include methyl; 2-methyl-2-butenyl; n-dodecyl; 4-cyclohexylethyl; methylnaphthylethyl; 2,2,1-bicycloheptyl; tolyl; xylyl; xenyl; methoxy; isobutoxy; n-octyloxy; phenoxy and 1,2-naphthoxyl.

Specific examples of compounds conforming to the formula $$H_c R_d X M$$

which are suitable for the purposes of the present invention are bromosilane—$BrSiH_3$; iodosilane—$ISiH_3$; chlorosilane—$ClSiH_3$; fluorosilane—$FSiH_3$; methylfluorosilane — $CH_3FSiH_2$; methylchlorosilane — $CH_3ClSiH_2$; chlorogermane — $ClGeH_3$; bromogermane — $BrGeH_3$; methylchlorostannane—$CH_3ClSnH_2$; and the like.

The conditions under which reaction between the organometallic compound and hydroxyl groups on the surface of the finely-divided inorganic solid can be accomplished are subject to considerable variation. However, in order to obtain a catalyst component with exceptionally high activity and reproducible character and performance it has been found to be all important that said finely-divided inorganic solid be essentially dry and anhydrous (i.e. free of molecular water in any form) at the time it is brought into contact with the organometallic compound.

In addition, it is recommended that the reaction of hydroxyl groups on the surface of the inorganic solid and the organometallic compound be accomplished so as to allow gaseous by-products of the reaction to be eliminated from the reaction zone in order to thereby insure that said reaction goes to completion. Generally, the said reaction can be carried out by contacting said inorganic solid with said organometallic compound, preferably in a solution thereof in an inert hydrocarbon medium, and maintaining the two reactants in intimate contact for a period of time sufficient to effect the desired chemical reaction resulting in the chemical bonding of the organometallic compound to the inorganic solid.

Elimination of the by-products of the reaction from the reaction zone, i.e. from the reaction medium, can be accomplished in any convenient manner such as, by sweeping the reaction vessel with an inert gas, by carrying out the reaction at sufficiently elevated temperatures while stirring to drive off by-products, and by complexing or reacting said by-products with suitable substances such as tertiary amines, tertiary arsines, tertiary phosphines, terpenes, terpinenes, tetrasubstituted hydrazines, carbides such as calcium carbide, and other substances which will react or complex with said by-products and thereby eliminate them.

It is pointed out that the organometallic compounds of the present invention must comprise a halogen atom and at least two hydrogen atoms in order to ultimately produce the catalysts of the present invention. Thus, the halogen atom is necessary for the reaction between the organometallic compound and a hydroxyl group on the surface of the inorganic solid subsequently during the activation procedure, two hydrogen atoms are normally necessary in order to produce an efficient catalyst.

In addition, it is pointed out that in order to produce the catalyst of the present invention, it is necessary that only between about 20 and about 80%, and preferably between about 35 and about 65% of the hydroxyl groups on the surface of the inorganic solid be reacted with the organometallic compound. Thus, a minimum of about 20% is necessary in order to accomplish substantial reaction, while the maximum of about 80% is necessary in order to leave at least about 20% unreacted hydroxyl groups for subsequent reaction with the transition metal halide, which reaction will be explained in detail hereinafter. The number of hydroxyl groups that react with the organometallic compound can be readily controlled by controlling the quantity of organometallic compound contacted with the inorganic solid.

Generally speaking, almost any temperature between about 0° C. and about 300° C. and even higher temperatures can be used satisfactorily, but the range from about 20° C. to about 125° C. is generally preferred for the reaction between the organometallic compound and hydroxyl groups. Assuming provision is made for intimate contact of the dry inorganic solid and the organometallic compound, the minimum time required to accomplish the chemical reaction will vary from periods of the order of about 10 hours at 25° C. to periods of the order of about 30 minutes at temperatures of 150° C. or over. Temperatures substantially higher than about 300° C. are completely needless and therefore of little or no interest.

Alternately, the reaction can also be carried out by other means, such as by exposing the inorganic solid to vapors of the organometallic compound, provided, of course, that said solid is exposed to sufficient quantities of vapors of said compound and under conditions of time and temperature that will foster reaction. Said vapors can be supplied under their own vapor pressures using partial vacuum if necessary, or with the aid of a dry, inert carrier gas such as dry nitrogen. This vapor phase treatment can be accomplished in any suitable manner such as by circulating the vapors through the particulate solid in a fixed bed reactor.

It is believed, though there is no intention to be bound by this explanation, that the type of reaction that occurs is correctly illustrated by the following illustrative equations, wherein silica represents the finely-divided inorganic solids bearing hydroxyl groups on the surface thereof and monochlorosilane represents the organometallic compounds:

EQUATION 1

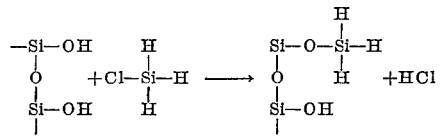

In accordance with the present invention, the solid product of the above reaction (this product is hereinafter referred to as the surface-reacted solid) is reacted with a transition metal halide (defined in detail hereinafter) in order to produce the potentially active catalyst. In order that a reaction can take place between the surface reacted solid and a transition metal halide, it is important that said surface reacted solid have on the surface thereof a substantial quantity of hydroxyl groups, i.e. preferably between about 20 and about 80%, and most preferably between about 35 and about 65% of the original surface hydroxyl group content.

Halide-type compounds of Group IVa, Va and VIa (hereinafter referred to as transition metal halides) suitable for the purposes of the present invention are the compounds conforming to the general empirical formula:

$$TO_aX_b$$

wherein T is a metal of Groups IVa, Va or VIa (where the group numbers correspond to the Mendeleev Periodic System); O is oxygen; $a$ is a number from 0 to 2; each X is any halogen; and $b$ is a number from 1 to 6.

Examples of suitable compounds conforming to said general formula are halides such as zirconium tetrachloride and titanium tetraiodide, and oxyhalides such as chromium oxychloride and vanadium oxychloride.

It is believed that the following equation correctly illustrates the reaction which occurs when in Equation 2 unreacted hydroxyl groups on the surface of the product of Equation 1 are reacted with titanium tetrachloride to produce the catalyst of the present invention:

EQUATION 2

$$TO_aX_b$$

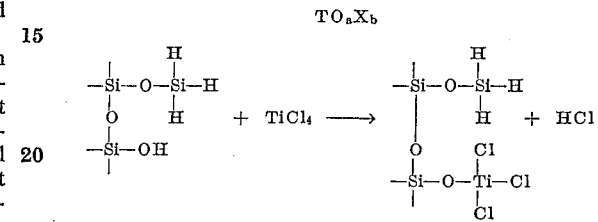

It is pointed out that the catalysts of the present invention (i.e. the solid product of Equation 2, for example) require activation by heating. Generally speaking, temperatures between about 100° C. and about 200° C. and even higher temperatures can be used satisfactorily but a temperature range between about 130° C. and about 200° C. is usually to be prefered. The minimum time required to accomplish the activation will vary from periods of about 5 hours at 130° C. to periods of about 1 minute at 200° C. or over. At higher temperatures, shorter periods of time are required; at substantially lower temperatures, the catalyst is either not formed at all or is of inferior quality.

It is pointed out that in order to avoid substantial premature activation of the catalyst product and/or the transition metal halide during reaction of the surface-reacted solid with the transition metal halide, it is necessary to utilize temperatures in accomplishing said reaction which are not sufficiently high to activate the catalyst product or cause substantial premature reaction between the surface-reacted solid and the transition metal halide. Suitable temperatures vary with the original hydroxyl group content of the inorganic solid, the organometallic compound utilized, etc., but suitable temperatures for any particular case can be readily determined.

Using the catalysts of this invention, polymerization and copolymerization of olefinic monomers can often be accomplished in the absence of liquids other than the monomers themselves, solvents or diluents, for example, in the gas phase, but it is usually more convenient to effect polymerization in the presence of a substantially inert liquid reaction medium. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as n-hexane, 2,3-dimethylbutane, n-dodecane, dimethylcyclopentane, methyldecaline, and the like are suitable. Also, members of the aromatic hydrocarbon series, such as isopropyl benzene, ethyltoluene, hemimellitene, pseudocumene, isodurene, isoamylbenzene, and particularly the mononuclear aromtic hydrocarbons such as xylenes, mesitylene and xylene-p-cymene mixtures, and the like are completely suitable.

The quantity of catalyst to be utilized in the polymerization reaction may vary, the precise quantity selected for use being dependent upon the desired rate of polymerization, the geometry of the reaction zone, the composition of the particular olefinic charging stock, temperature and other reaction variables.

Harmful impurities in the liquid hydrocarbon reaction medium can be effectively neutralized prior to the formation therein, or addition thereto, of the catalyst or catalyst components of this invention by treating the liquid medium with a metal alkyl or a transition metal compound. The olefinic charging stocks can also be purified by any known means such as bubbling said stocks through a solution of a metal alkyl in a hydrocarbon solvent prior to their introduction into the polymerization reactor.

Temperature control during the course of the polymerization process can be readily accomplished when there is present in the reaction zone a large liquid mass having relatively high heat capacity. Accordingly, a liquid hydrocarbon reaction medium which can be cooled by indirect heat exchange with a suitable coolant inside or outside the reaction zone is preferably supplied to the reaction zone.

The contact time or space velocity employed in the polymerization process will be selected with reference to the other process variables such as the particular catalysts utilized, the specific type of product desired, and the extent of monomer conversion desired in any given run or pass over the catalyst. In general, this variable is readily adjustable to obtain the desired results.

There follow a number of illustrative non-limiting examples:

Example 1

To a 2000 milliliter, glass three neck reaction flask equipped with a stirrer, condenser and nitrogen inlet and outlet tubes there is charged 20 grams of "Cab-O-Sil," a pyrogenic silica produced by Cabot Corporation, and which has an average particle diameter of about 10 millimicrons and a hydroxyl group content on the surface thereof of about 1.5 milliequivalents per gram. Next, there is added to said vessel 1650 milliliters of toluene and the resulting slurry is dried by being heated to, and maintained at, the boiling point of toluene, i.e. about 110° C., for about 24 hours, while a water/toluene azeotrope is removed from the reaction vessel by periodic distillation until 450 milliliters of distillate has been removed. The vessel is then cooled and charged with 15 millimoles of methylchlorosilane—$CH_3ClSiH_2$. The resulting slurry is then maintained at about 28° C. for about 48 hours with continuous stirring while the contents are swept with a stream of dry nitrogen. Subsequently, the extent of the reaction between methylchlorosilane and hydroxyl groups on the surface of the silica is determined by measuring the quantity of HCl that was produced and by testing the liquid contents of the vessel for the absence therein of methylchlorosilane and the said silica is found to have 15 milliatoms of silicon bound to the surface thereof. The contents of the flask are then stirred vigorously and swept with a stream of dry nitrogen for about 0.5 hour and it is found that no further amounts of HCl are produced. Next, the contents of the flask are heated to, and maintained at a temperature of about 60° C., vigorously stirred and swept by dry nitrogen and there is charged dropwise thereinto about 12 millimoles of titanium tetrachloride. After about 32 hours the extent of the reaction between hydroxyl groups on the surface-reacted silica and the titanium tetrachloride is determined by measuring the amount of HCl that was produced and by testing the liquid contents of the flask for the absence therein of titanium tetrachloride and it is found that about 12 milliatoms of titanium are bound to the surface of the solid.

180 milliliters of the titanated, surface-reacted silica slurry, comprising about 3 grams of said surface-reacted silica and about 1.8 milliatoms of titanium are transferred to a one gallon stainless steel stirred autoclave. Said autoclave is then heated to and maintained at a temperature of about 190° C. for a period of about 5 hours. Next, the autoclave is cooled to and thereafter maintained at, about 80° C. and there is charged thereinto about 900 milliliters of anhydrous toluene, followed by pressurization to about 250 p.s.i. with ethylene. Thereafter, the autoclave is continuously stirred for about two hours and the pressure therein is maintained at about 250 p.s.i. by the periodic introduction thereinto of additional ethylene. The solid contents therein are then removed, dried and weighed and it is found that solid polyethylene has been produced.

When, under the same conditions, the catalyst slurry is not heated prior to the introduction thereinto of ethylene, no solid polymer is produced.

Example 2

This example is essentially a duplicate of Example 1 with the exception that different starting materials are utilized in the production of the catalyst and polymerization is effected with butene-1 instead of ethylene. Accordingly, there is introduced into a 2000 milliliter glass flask a slurry comprising 1650 milliliters of isooctane and 20 grams of "Alon," a pyrogenic alumina produced by Deutsche Gold-und Silber-Scheideanstalt vormals Roessler, and which has an average particle diameter of about 10–40 millimicrons and a hydroxyl group content on the surface thereof of about 0.7 milliequivalent per gram. Said slurry is then azeotropically dried for about 8 hours until about 450 milliliters of a water/isooctane azeotrope has been removed. After cooling to about ambient temperature there is charged to the flask 8 millimoles of bromogermane—$BrGeH_3$ and the resulting mixture is thereafter heated to and maintained at a temperature of about 55° C. with continuous stirring for about 30 hours while the contents of said flask are swept with a stream of dry nitrogen. Subsequently, the extent of the reaction between the bromogermane and hydroxyl groups on the surface of the alumina is determined by measuring the quantity of HBr that was produced and by testing the liquid contents of the flask for the absence therein of bromogermane. Next, said slurry is heated to and maintained at a temperature of about 50° C. and there is then charged dropwise thereinto about 5 millimoles of vanadium oxychloride. After about 20 hours, the extent of the reaction between hydroxyl groups on the surface-reacted alumina and the vanadium oxychloride is determined by measuring the amount of HCl that was produced and by testing the liquid contents of the flasks for the absence therein of vanadium oxychloride and it is found that about 5 milliatoms of vanadium are bound to the surface of the solid. Polymerization of butene-1 is effected as follows:

360 milliliters of the vanadated, surface-reacted alumina slurry, comprising about 6 grams of the surface-reacted alumina and about 1.5 milliatoms of vanadium are transferred to a 1000 milliliter stainless steel reaction bomb. Said bomb is sealed, heated to about 185° C. and rotated end over end for about 3 hours at a rate of about 30 r.p.m. Next, the bomb is cooled to about −30° C. in a calcium chloride ice bath and there is charged thereinto about 500 millimoles of liquid butene-1. The bomb is then resealed, removed from the cooling bath and rotated end over end at a rate of about 30 r.p.m. for about 2 hours at ambient temperature. Subsequently, examination of the solid contents of the bomb reveals that a solid butene-1 polymer has been produced.

The polymers produced by the catalyst of the present invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as carbon black, silicas, extenders, plasticizers, pigments, insecticides, fungicides, etc., can be incorporated into the polymers.

Obviously, many changes may be made in the above examples and procedures without departing from the scope of the invention. For example, although only titanium tetrachloride and vanadium oxychloride are utilized in the above examples, other Group IVa, Va and VIa transition metal halides and oxyhalides such as titanium tetrafluoride, zirconium tetrachloride, chromium oxychloride and vanadium pentabromide are also suitable for the purposes of the present invention.

Further, pyrogenically coformed, or coprecipitated metal oxides, or metal oxides coformed with, or mixed with, other compounds are suitable choices for the practice of the invention.

Accordingly, it is intended that the above disclosure be regarded as illustrative and as in no way limiting the scope of the invention.

What I claim is:

1. A process for producing a polymerization catalyst which can be activated by heating which comprises reacting between about 20% and about 80% of the hydroxyl groups on the surface of an inorganic solid having an average particle diameter of less than about 0.1 micron and having at least about $1 \times 10^{-4}$ equivalents per gram of hydroxyl groups chemically bound thereto first with
(a) a compound conforming to the formula $$H_c R_d X M$$

where each H is hydrogen; $c$ is a number from 2 to 3; R is any hydrocarbon radical, alkoxy radical and aryloxy radical; $d$ is a number from 0 to 1; X is any halogen; M is a quadrivalent metal of Group IVb; and the sum of $c+d$ equals 3; and subsequently with
(b) a compound conforming to the formula $$TO_a X_b$$

wherein T is chosen from the group consisting of the metals of Groups IVa, Va and VIa; each O is oxygen; $a$ is a number from 0 to 2; each X is any halogen; and $b$ is a number from 1 to 6.

2. The process of claim 1 wherein between about 35% and about 65% of the hydroxyl groups on the surface of the inorganic solid are reacted with the compound conforming to the formula $$H_c R_d X M$$

and between about 35% and about 65% of said hydroxyl groups and reacted with the compound conforming to the formula $$TO_a X_b$$

3. The process of claim 1 wherein said inorganic solid has an average particle diameter below 0.1 micron and at least about $2 \times 10^{-4}$ equivalents per gram of hydroxyl groups on the surface thereof.

4. The process of claim 1 wherein in the formula $$H_c R_d X M$$

M is chosen from the group consisting of silicon and germanium.

5. The process of claim 1 wherein in the formula $$H_c R_d X M$$

M is silicon.

6. The process of claim 1 wherein in the formula $$TO_a X_b$$

T is a metal of Group IVa.

7. The process of claim 1 wherein in the formula $$TO_a X_b$$

T is a metal of Group Va.

8. The process of claim 1 wherein in the formula $$TO_a X_b$$

T is titanium.

9. The process of claim 1 wherein said compound conforming to the formula $$TO_a X_b$$

is titanium tetrachloride.

10. A material which can be activated by heating to produce an active polymerization catalyst which comprises an inorganic solid having an average particle diameter of less than about 0.1 micron and having chemically bound to the surface thereof at least about $2 \times 10^{-5}$ equivalents per gram of structures
(a) conforming to the formula:

$$H_c R_d M$$

wherein M is a quadrivalent metal of Group IVb of the Mendeleev Periodic Table; each H is hydrogen; $c$ is a number from 2 to 3; R is chosen from the group consisting of any hydrocarbon radical, alkoxy radical and aryloxy radical; $d$ is a number from 0 to 1; and wherein M is chemically bound directly to an oxygen atom in the surface of said inorganic solid, and at least about $2 \times 10^{-5}$ equivalents per gram of structures
(b) conforming to the formula:

$$TO_a X_b$$

wherein T is chosen from the group consisting of the metals of Groups IVa, Va and VIa; each O is oxygent; $a$ is a number from 0 to 2; each X is any halogen; $b$ is a number from 1 to 5; and wherein T is chemically bound directly to at least one oxygen atom in the surface of said inorganic solid, the sum of the structures conforming to (a) and (b) being at least about $1 \times 10^{-4}$ equivalents per gram.

11. The material of claim 10 wherein in the formula:

$$H_c R_d M$$

M is chosen from the group consisting of silicon and germanium.

12. The material of claim 10 wherein in the formula:

$$H_c R_d M$$

M is silicon and $c$ is 3.

13. The material of claim 10 wherein in the formula:

$$H_c R_d M$$

M is silicon, R is any alkyl group and $d$ is 1.

14. The material of claim 10 wherein in the formula:

$$TO_a X_b$$

T is a metal of Group IVa.

15. The material of claim 10 wherein in the formula:

$$TO_a X_b$$

T is titanium, $a$ is 0 and each X is chlorine.

16. The material of claim 10 wherein in the formula:

$$TO_a X_b$$

T is a metal of Group Va.

17. The material of claim 10 wherein said inorganic solid has an average particle diameter below about 0.1 micron and at least about $1 \times 10^{-4}$ gram atoms per gram of T chemically bonded to the surface thereof.

18. A process for polymerizing a substance chosen from the group consisting of a mono-olefin, mono-olefins, a di-olefin, di-olefins and mixtures thereof which comprises heating to temperatures between about 100° C. and about 200° C. an inorganic solid having an average particle diameter of less than about 0.1 micron and having chemically bound to the surface thereof at least about $2 \times 10^{-5}$ equivalents per gram of surface structures:
(a) conforming to the formula:

$$H_c R_d M$$

wherein M is a quadrivalent metal of Group IVb of the Mendeleev Periodic Table; each H is hydrogen; $c$ is a number from 2 to 3; R is chosen from the group consisting of any hydrocarbon radical, alkoxy radical and aryloxy radical; $d$ is a number from 0 to 1; and wherein M is chemically bound directly to an oxygen atom in the surface of said inorganic solid, and at least about $2 \times 10^{-5}$ equivalents per gram of structures (b) conforming to the formula:

$$TO_aX_b$$

wherein T is chosen from the group consisting of the metals of Groups IV*a*, V*a* and VI*a*; each O is oxygen; *a* is a number from 0 to 2; each X is any halogen; *b* is a number from 1 to 5; and wherein T is chemically bound directly to at least one oxygen atom in the surface of said inorganic solid; the sum of the structures conforming to (a) and (b) being at least about $1 \times 10^{-4}$ equivalents per gram, and contacting said substance with the resulting active catalyst at temperatures between about $-25°$ C. and about $250°$ C.

19. The process of claim 18 wherein the substance polymerized is ethylene.

20. The process of claim 18 wherein in the formula:

$$H_cR_dM$$

M is chosen from the group consisting of silicon and germanium.

21. The process of claim 18 wherein in the formula:

$$H_cR_dM$$

M is silicon and *c* is 3.

22. The process of claim 18 wherein in the formula:

$$H_cR_dM$$

M is silicon, R is any alkyl group and *d* is 1.

23. The material of claim 18 wherein in the formula:

$$TO_aX_b$$

T is a metal of Group IV*a*.

24. The material of claim 18 wherein in the formula:

$$TO_aX_b$$

T is titanium, *a* is 0 and each X is chlorine.

25. The material of claim 18 wherein in the formula:

$$TO_aX_b$$

T is a metal of Group V*a*.

26. The process of claim 18 wherein said inorganic solid bearing chemically bound surface structures is activated by being heated to temperatures between about $130°$ C. and about $200°$ C.

27. The process of claim 18 wherein the substance polymerized is an $\alpha$-mono-olefin.

28. The process of claim 18 wherein the substance polymerized is a conjugated di-olefin having a double bond in the alpha position.

References Cited by the Examiner

UNITED STATES PATENTS

| | | | |
|---|---|---|---|
| 3,008,943 | 11/1961 | Guyer | 260—94.9 |
| 3,031,514 | 4/1962 | Kosmin | 260—94.9 |
| 3,048,574 | 8/1962 | Wiberg et al. | 260—94.9 |
| 3,166,544 | 1/1965 | Orzechowski | 260—94.9 |

JOSEPH L. SCHOFER, *Primary Examiner.*

F. L. DENSON, *Assistant Examiner.*